Nov. 14, 1961  E. McCORMICK  3,008,664
REEL AND WINDER FOR FISHING LEADERS
Filed Nov. 19, 1958

INVENTOR.
EVERETT McCORMICK
BY
H. W. Breleford
ATTORNEY

United States Patent Office 3,008,664
Patented Nov. 14, 1961

3,008,664
REEL AND WINDER FOR FISHING LEADERS
Everett McCormick, 223 E. Victoria St.,
Santa Barbara, Calif.
Filed Nov. 19, 1958, Ser. No. 775,015
6 Claims. (Cl. 242—96)

My invention relates to fly fishing equipment, and has particular reference to a leader box for holding leaders wound on reels and having a winder for the reels, constructed as a part of the box.

Fly fisherman employ long fine leaders of filamentary materials, such as silk worm, "gut" or synthetic filaments of the type to which the trademark Nylon is applied. These leaders are frequently tapered so that the end tied to the fishing line is thicker than the end tied to the fly which is frequently so fine as to lie sometimes invisible. These leaders vary in length from six to twelve feet and present a constant problem of storage. If a fisherman wishes to replace one leader with another, he must wind the first one in some manner so that it can be stored and then take out the desired leader and tie it to the fly line.

Various attempts have been made to solve this problem of storage of leaders. Many different types of envelopes and bellows type leader pouches are used. For these the fisherman winds the leader about one hand, and secures the loop by twisting one end about the bundle. However, when he wishes to use it again, unless he very carefully unspools it, the filament gets caught in itself and ties itself into knots, requiring great patience and skill to untangle the mess. Other fishermen use spools, but these have been so bulky as to be impractical.

I have devised a simple type of leader reel that solves very satisfactorily the problem of leader storage. A round piece of heavy paper or fine cardboard is punched so that fingers are cut out of the sheet of material. These fingers point outwardly, and when they are bent outwardly of the sheet, they form a continuous frame upon which the leaders may be wound. When the leaders are removed the fisherman merely hangs on to one end of the leader and lets the reel fall by gravity, unreeling as it drops. Snarls and knots are completely avoided.

Reels of this general construction have been formed of metal with the fingers permanently bent outwardly. Such however are bulky and expensive. I have discovered, however, a simple winding device that not only winds leaders on my reels, but also bends the fingers relative to the body of the reel. This permits the fisherman to carry flat sheet reels made in accordance with my invention wherein the fingers are not raised, but instead are merely cut to shape in the flat paper stock. If he wishes to wind a reel, the winder mechanism will automatically make the fingers project so that the leader can be wound upon them. Also, when a leader has been taken off of a reel, the reel may completely flatten, but my winder will again cause the fingers to project.

While my winder could be a separate mechanism, it combines its greatest utility with availability when it forms a part of the box in which the leader reels are stored. I prefer at present to build the winder into the cover of a leader box and it is then always available when exchanging leaders or using or storing them.

It is a general object of my invention to provide an inexpensive and reliable reel for fishing leaders.

Another object is to provide a leader reel that may be simply punched from a single sheet of material.

A further object is to provide a winder for leader reels of sheet material.

Another object is to provide a combination of a winder and a sheet material reel for filamentary materials.

A further object is to provide a leader box for leader reels having a built-in winder for the reels.

Other objects and advantages of my invention will be apparent in the following description and claims considered together with the accompanying drawings forming an integral part of this application in which:

Figure 1:
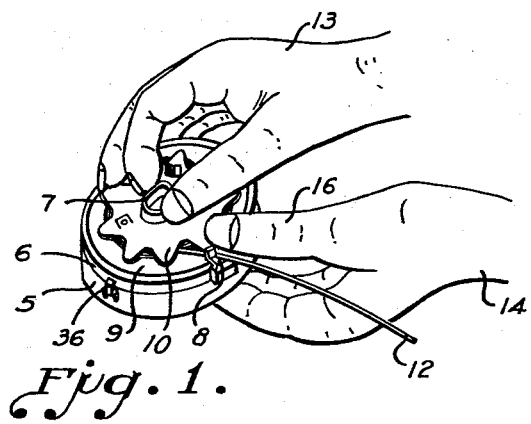
FIG. 1 is a perspective view of a fisherman using a preferred form of the invention for winding a leader upon one of my reels.

Referring to FIG. 1 there is illustrated a leader box 5 having a hinged top 6 on which is mounted a winder mechanism including a rotatable hollow hub 7 and a combined depressor and leader guide 8. A round leader reel 9 has one portion of its periphery passed under the depressor 8 and a hole at its center is passed over the rotatable hub 7. The depressor 8 causes fingers 10 to be inclined relative to the periphery to the reel 9 so that a fishing leader 12 may be passed between the fingers 10 and the body of the reel 9.

To use the device of FIG. 1, the operator manually rotates the hub 7 with his right hand 13 and holds the entire leader box with his left hand 14. The leader 12 passes through a guide slot in the depressor 8 and is held therein by the user's left thumb 16. Accordingly, rotation of the hub 7 causes the leader 12 to be wound upon the fingers 10 to be securely stored.

Figure 2:
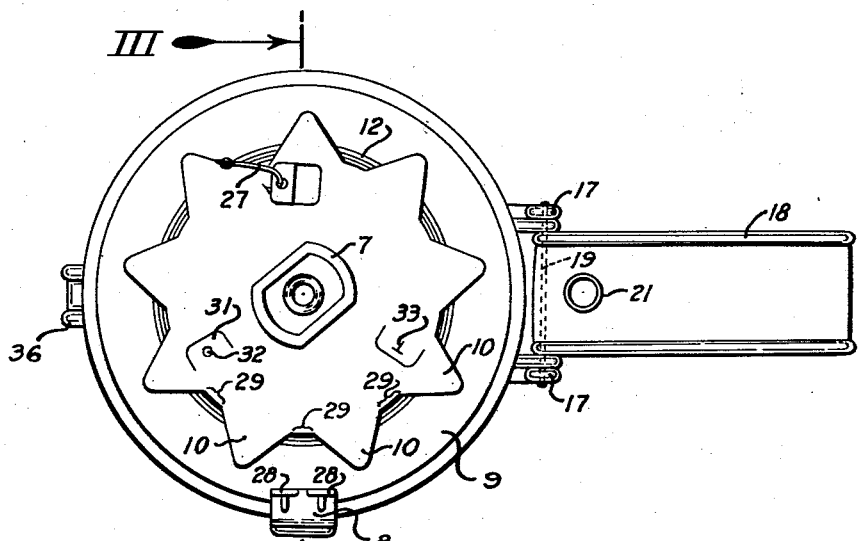
FIG. 2 is an enlarged plane view of the leader box, winder, and leader reel of FIG. 1.
Figure 3:
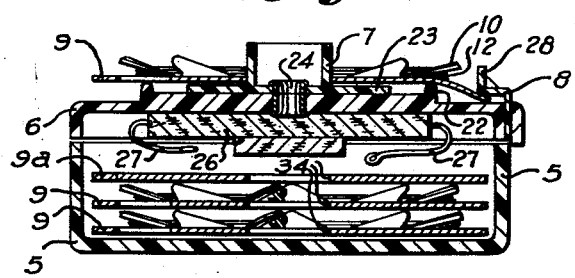
FIG. 3 is a sectional view along the line III—III of FIG. 2.

The details of constructions are illustrated more particularly in FIGS. 2 and 3. The box 5 may be of any desired shape or size and while metal is desirable, I presently prefer to use molded organic plastic. The top or cover 6 of the box or container 5 is preferably hinged and any desired hinge structure may be used such as that illustrated as 17 in FIG. 2. If desired, a carrying strap 18 may engage a hinge pin 19 and one end of this strap 18 may carry a snap 21 so that the strap 18 can be passed about the fisherman's belt.

The entire winder structure may be disposed on the cover 6. This winder includes three principal parts, the hollow hub 7, the depressor 8 and a support 22 disposed opposite the depressor 8 to support the reel 9 at the approximate point where the fingers 10 are connected to the body of the reel 9. The hub 7 is made hollow solely to preserve to reduce the amount of material required and has a non-circular outline or axial profile as best illustrated in FIG. 2. This rotatable hub 7 may be rotatably secured to the cover 6 in any desired fashion, but I find that stability and ease of rotation is enhanced by providing a washer structure 23 which rides on top of the cover 6. A hollow rivet 24 may secure this hub and its rotatable washer 23 to the cover 6. I have found it convenient to add a disk 26 of cork to the interior of the cover 6 so that the flies or fish hooks 27 may be secured inside of the leader box.

The second part of the winder mechanism, the depressor, is also illustrated in FIG. 3. There it will be noted that the depressor 8 may be crank-shaped wih one end being secured to the cover 6 and the upper end being forked or bifurcated with two posts 28 forming a leader guide between them. The horizontal part (FIG. 3) of the depressor 8 engages the outer periphery of the reel 9 to bend it downwardly while the fingers 10 still project horizontally. This forms the necessary gap or angle between the fingers 10 and periphery of the reel so that the leader 12 may be wound on the fingers 10. The winding operation bends the fingers 10 upwardly as illustrated by the filled reels in FIG. 3.

The third part of the winder, the support 22 is best illustrated in FIG. 3 and there it will be noted that the support 22 is so located with respect to the reel fingers 10 that the reel is supported at the base of the fingers 10 or just slightly outwardly of the base of the fingers 10. This support keeps the fingers 10 in their normal plane. The position while the periphery of the reel 9 is bent downwardly. This periphery portion accordingly can be designated as the area of the reel 9 that is disposed radially outwardly of the support 22. While the support 22 is most essential opposite the depressor I prefer in practice to make it continuous to support the reel at all sectors.

The leader reels 9 are also formed particularly in accordance with my invention and there is illustrated in FIG. 3 inside of the box, two loaded reels 9 and one unloaded reel 9a. The reel 9a accordingly is the shape of the reel after it has been manufactured and there it will be noted that the reel is completely flat. The method of cutting the fingers 10 is best illustrated in FIG. 2. Each finger accordingly is formed by a continuous angular slot or slit cut into the body of the reel and the fingers 10 are secured to the body of the reel by the unslotted portion 29 but adjacent to fingers 10. These regions 29 accordingly are the base or root of the fingers 10; that is the place where the fingers 10 are secured to the reel body 9. If desired hook retaining members may also be slitted into the reel body in the form of tabs 31 having an aperture 32 or a T-shaped slit 33 through which may be passed a fish hook 27.

Also illustrated by the reels 9a and 9 inside of the box 5 is the central aperture which is passed over the hub 7 and designated by the numeral 34. This central aperture has the same size and shape as the profile hub 7.

When the flat reel 9a is first placed on the winder, the outer periphery of the reel 9 is first placed under the depressor 8 shown in FIG. 3. The aperture 34 is then passed over the hub 7. The support 22 holds all of the reel 9a in a flat plane except for the part depressed under the depressor. The support accordingly holds the reel 9a in a flat plane except for that sector of the periphery that is pulled downwardly by the depressor 8. Inasmuch as the fingers 10 are free of the body of the reel except for their connecting portions 29, they will project outwardly in the plane of the body of the reel. This, as previously explained, provides the angular diverges between periphery and finger that forms a frame upon which the leader material 12 may be wound.

My reels 9 may be formed of any suitable material. At present I prefer to use a parchment or vellum type paper, although plastics or other sheet material having similar characteristics would be desirable. In general the material must be pliable and yet somewhat resilient or elastic so that it will spring back to its former position or shape. Complete recovery however from a resiliency standpoint is not necessary. Also thin metal could be employed, for example, resilient aluminum foil which is generally employed in tinsel type of decorations and Christmas tree ornaments. Also if desired a material that is light and porous could be used so that the reel would float if accidentally dropped into the water. The material should however be soft enough so that it would not cut into the type of leader employed.

The winder of course may be made from any suitable material and at present, I prefer to employ a molded plastic. As illustrated in FIG. 3, the depressor may be a crank shape member cemented into the slot in the circumference of the top or cover 6. The usual type of snap catch can be employed to keep the cover 6 closed and this is illustrated at 36 in FIGS. 1 and 2. The guide for the leader found between the two posts 28 need not be integrally formed with the depressor 8, but I prefer at present to combine these elements into one structure.

Various modifications and improvemtns will occur to those skilled in the art. While I have described my invention with respect to a specific embodiment thereof, I do not limit my self to this embodiment, but claim all such modifications, variations and improvements that follow within the true spirit and scope of my invention.

I claim:

1. A fishing leader winder for round reels of sheet material that have outwardly pointing fingers normally disposed in the plane of the sheet, and inside the periphery of the round reel, said winder comprising; a frame, a hub mounted on the frame for rotation; means for securing the reel to the hub for rotating the reel in a plane; and a depressor mounted on the frame for engaging the periphery of the reel and depressing it out of said plane, whereby said fingers remain substantially in said plane and a leader can lie engaged by the fingers when the reel periphery is depressed.

2. A winder as specified in claim 1 wherein a leader guide is provided adjacent to the depressor, to guide a leader onto the reel at the region of maximum divergence between the fingers and the reel periphery.

3. A winder as specified in claim 1 wherein a leader guide is combined with the depressor.

4. The combination of a leader reel and winder therefor, said leader reel comprising; a round section of stiff but pliable sheet material; and outwardly pointing fingers formed on said sheet on a circle within the periphery, said winder comprising: a frame; a rotatable hub mounted on the frame; means for removably securing the reel sheet to the hub for rotation in a plane; and a depressor secured to the frame for engaging and bending the periphery of the reel sheet out of said plane, said depressor bending the sheet out of the plane to create an angle between the fingers and the depressed portion of the periphery so that a leader can be wound on the fingers.

5. The combination of a leader reel and winder for the reel, said reel comprising; a round section of resilient sheet material that bends elastically; outwardly pointing fingers secured to the sheet, each at its base on a circle within the outer periphery of the sheet material, said winder comprising: a frame; a rotatable hub mounted on the frame; means for removably securing the reel sheets to the hub for rotation of the reel sheets in a plane; a depressor secured to the frame for engaging a short section of the periphery of the reel sheet and bending it out of said plane; and means for supporting the reel sheet in said plane adjacent to said depressor and at the circle for the base of the fingers; said depressor elastically bending the periphery to form an angle between it and the fingers so that leaders may be wound on the fingers as the reel is rotated.

6. The combination of a leader reel and winder as set forth in claim 5 wherein the means for securing the reel sheets to the hub is a non-circular hole in the sheet and a complimentary non-circular outline of the hub so that the sheet may pass over the hub and be engaged by it.

References Cited in the file of this patent

UNITED STATES PATENTS

| 1,588,385 | Miller | June 8, 1926 |
| 1,635,378 | Mead | July 12, 1927 |
| 1,908,278 | Angell | May 9, 1933 |
| 1,993,970 | MacMurray | Mar. 12, 1935 |
| 2,008,026 | MacMurray | July 16, 1935 |
| 2,137,618 | Krimmel | Nov. 22, 1938 |

FOREIGN PATENTS

| 145,687 | Sweden | June 8, 1954 |
| 22,650 | Great Britain | of 1906 |
| 331,741 | Great Britain | July 10, 1930 |